United States Patent
Lee et al.

(10) Patent No.: US 12,424,667 B2
(45) Date of Patent: Sep. 23, 2025

(54) SECONDARY BATTERY AND DEVICE INCLUDING THE SAME

(71) Applicant: LG ENERGY SOLUTION, LTD., Seoul (KR)

(72) Inventors: Jeongbeom Lee, Daejeon (KR); Jong Keon Yoon, Daejeon (KR); Hoejin Hah, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 668 days.

(21) Appl. No.: 17/770,195

(22) PCT Filed: Sep. 16, 2020

(86) PCT No.: PCT/KR2020/012510
§ 371 (c)(1),
(2) Date: Apr. 19, 2022

(87) PCT Pub. No.: WO2021/118020
PCT Pub. Date: Jun. 17, 2021

(65) Prior Publication Data
US 2022/0393249 A1    Dec. 8, 2022

(30) Foreign Application Priority Data

Dec. 12, 2019  (KR) .................. 10-2019-0165769

(51) Int. Cl.
*H01M 10/0587* (2010.01)
*H01M 50/107* (2021.01)
*H01M 50/538* (2021.01)

(52) U.S. Cl.
CPC ..... *H01M 10/0587* (2013.01); *H01M 50/107* (2021.01); *H01M 50/538* (2021.01)

(58) Field of Classification Search
CPC .......... H01M 10/0587; H01M 50/107; H01M 50/538
See application file for complete search history.

(56) References Cited

U.S. PATENT DOCUMENTS

| | | | |
|---|---|---|---|
| 2006/0073380 A1* | 4/2006 | Kim .................. | H01M 10/0587 29/623.1 |
| 2007/0190407 A1* | 8/2007 | Fujikawa .............. | H01M 50/46 429/174 |

(Continued)

FOREIGN PATENT DOCUMENTS

| | | |
|---|---|---|
| CN | 103380510 A | 10/2013 |
| JP | 2001-68166 A | 3/2001 |

(Continued)

OTHER PUBLICATIONS

Extended European Search Report for European Application No. 20899069.7, dated Feb. 22, 2023.

(Continued)

*Primary Examiner* — James Lee
(74) *Attorney, Agent, or Firm* — Birch, Stewart, Kolasch & Birch, LLP

(57) ABSTRACT

A secondary includes an electrode assembly having a jelly roll structure including a positive electrode sheet, a negative electrode sheet, and a separator; a cylindrical case in which the electrode assembly is received; and a flat spiral spring positioned between an outer peripheral surface of the electrode assembly and an inner surface of the cylindrical case.

9 Claims, 5 Drawing Sheets

(56) References Cited

U.S. PATENT DOCUMENTS

| | | |
|---|---|---|
| 2011/0159328 A1 | 6/2011 | Yeo |
| 2012/0107678 A1 | 5/2012 | Kim et al. |
| 2014/0038027 A1 | 2/2014 | Kanemoto et al. |
| 2014/0045005 A1 | 2/2014 | Schumann et al. |
| 2015/0263378 A1 | 9/2015 | Pasma et al. |
| 2019/0280325 A1 | 9/2019 | Jung et al. |

FOREIGN PATENT DOCUMENTS

| | | |
|---|---|---|
| JP | 2001-135299 A | 5/2001 |
| JP | 2013-126852 A | 6/2013 |
| JP | 2014-2836 A | 1/2014 |
| JP | 2014-505986 A | 3/2014 |
| JP | 2018-8090 A | 1/2015 |
| JP | 2015-170395 A | 9/2015 |
| JP | 2017-98107 A | 6/2017 |
| KR | 20-1999-0031053 U | 7/1999 |
| KR | 10-2000-0038155 A | 7/2000 |
| KR | 10-2006-0031939 A | 4/2006 |
| KR | 10-2009-0129621 A | 12/2009 |
| KR | 10-1040875 B1 | 6/2011 |
| KR | 10-2012-0047196 A | 5/2012 |
| KR | 10-2018-0012444 A | 2/2018 |
| KR | 10-2019-0007246 A | 1/2019 |
| KR | 10-2019-0033904 A | 4/2019 |

OTHER PUBLICATIONS

International Search Report for PCT/KR2020/012510 mailed on Jan. 11, 2021.

\* cited by examiner

SECONDARY BATTERY AND DEVICE INCLUDING THE SAME

TECHNICAL FIELD

Cross Citation With Related Application(s)

This application claims the benefit of Korean Patent Application No. 10-2019-0165769 filed on Dec. 12, 2019 with the Korean Intellectual Property Office, the disclosure of which is incorporated herein by reference in its entirety.

The present disclosure relates to a secondary battery and a device including the same, and more particularly to a secondary battery including an electrode assembly having a jelly roll structure and a device including the same.

BACKGROUND ART

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing much attention.

In particular, as technology development and demands for mobile devices increase, the demand for batteries as energy sources is rapidly increasing. Accordingly, many researches on batteries capable of meeting diverse demands have been conducted.

Typically, a lithium secondary battery, such as a lithium ion battery or a lithium ion polymer battery, which have advantages such as a high energy density, a discharge voltage, an output stability, and the like is highly demanded.

Further, the secondary battery may be classified based on the shape of a battery case into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of a laminated aluminum sheet.

Further, the secondary battery may also be classified based on how the electrode assembly, having a structure in which a positive electrode, a negative electrode, and a separator interposed between the positive electrode and the negative electrode are stacked, is structured.

Typically, the electrode assemblies may include a jellyroll (wound) type electrode assembly in which a long sheet type positive electrode and a long sheet type negative electrode are wound with a separator interposed therebetween, and a stacked (laminated) type electrode assembly in which a plurality of positive electrodes and negative electrodes, cut into predetermined unit sizes, are sequentially stacked with separators being interposed therebetween, and the like.

Recently, in order to solve the problems involved in the jelly-roll type electrode assembly and the stacked type electrode assembly, a stacked/folded type electrode, which is a combination of the jelly-roll type electrode assembly and the stacked type electrode assembly, has been developed. The stacked/folded type electrode assembly has a structure in which unit cells, which are stacked with certain units of the positive electrodes and the negative electrodes while a separator being interposed therebetween, are sequentially wound in a state of being positioned on a separator film.

Meanwhile, in the case of a lithium secondary battery, a "swelling phenomenon" may occur in which the volume of the electrode assembly expands while the electrode becomes thicker during repetitive charging and discharging processes. If this swelling phenomenon is increased, not only the performance of the secondary battery is deteriorated, but the outer shape of the secondary battery can be changed, thus adversely affecting the structural stability.

In particular, in the case of a lithium secondary battery using a pure lithium metal as a negative electrode, the charging mechanism is different from that of a general graphite negative electrode, and thus, the thickness expansion of the negative electrode leads to a swelling phenomenon of the secondary battery, which may cause serious problems.

In the graphite negative electrode, intercalation occurs in which lithium transferred from the positive electrode is intercalated into graphite which is a layered structure, but in the lithium metal negative electrode, the negative electrode deposited on the positive electrode is stacked as it is, so the thickness change of the secondary battery is more serious.

For example, when applying a positive electrode loading of 4.0 $mAh/cm^2$, a 20 μm lithium metal negative electrode can stretch by 10 μm based on both sides, and when using a Cu current collector, a 50 μm lithium metal negative electrode is increased to 90 μm. In particular, considering that the lithium metal negative electrode is porous and that lithium dendritic growth occurs, changes in the thickness of the secondary battery can be more serious.

Therefore, there is a need to develop a secondary battery that can effectively control a volume expansion occurring during charging and discharging.

DETAILED DESCRIPTION OF THE INVENTION

Technical Problem

Embodiments of the present disclosure have been designed to solve the above-mentioned problems of the previously proposed methods, and an object of the present disclosure is to provide a secondary battery that can effectively control a volume expansion occurring during charging and discharging, and a device including the same.

However, the problem to be solved by embodiments of the present disclosure is not limited to the above-described problems, and can be variously expanded within the scope of the technical idea included in the present disclosure.

Technical Solution

A secondary battery according to the embodiments of the present disclosure includes: an electrode assembly having a jelly roll structure including a positive electrode sheet, a negative electrode sheet, and a separator; a cylindrical case in which the electrode assembly is received; and a flat spiral spring positioned between an outer peripheral surface of the electrode assembly and an inner surface of the cylindrical case.

The flat spiral spring may be configured such that first end contacts the electrode assembly, a second end contacts the inner surface of the cylindrical case, and the flat spiral spring wraps the electrode assembly one or more times.

A positive electrode tab attached to the positive electrode sheet may be extended upward from the electrode assembly, and a negative electrode tab attached to the negative electrode sheet may be extended downward from the electrode assembly.

The first end of the flat spiral spring may coincide with at least one of the positive electrode tab or the negative electrode tab in a radial direction of the electrode assembly.

The thickness of the flat spiral spring may increase from the first end to the second end.

The flat spiral spring may include first and second flat spiral springs respectively positioned at opposite ends of the electrode assembly in a height direction of the electrode assembly.

The flat spiral spring may include a third flat spiral spring positioned between the first and second flat spiral springs.

The first and second flat spiral springs may have a larger spring constant than a spring constant of the third flat spiral spring, or a number of times of wrapping the electrode assembly by the first and second flat spiral springs may be greater than a number of times of wrapping the electrode assembly by the third flat spiral spring.

The first and second flat spiral springs may respectively wrap portions of the outer circumferential surface of the electrode assembly corresponding to portions to which the positive electrode tab and the negative electrode tab are attached to the electrode assembly.

A negative electrode active material may be coated onto the negative electrode sheet, and the negative electrode active material may include at least one of Li, Si, $SiO_2$, or Sn.

Advantageous Effects

According to the embodiments of the present disclosure, a flat spiral spring is arranged between the electrode assembly having a jelly roll structure and the cylindrical case, so that not only the position of the electrode assembly is stably fixed, but also the volume expansion of the electrode assembly generated during charging and discharging is suppressed, thereby enabling reversible charging and discharging.

DETAILED DESCRIPTION OF THE EMBODIMENTS

Figure 1:
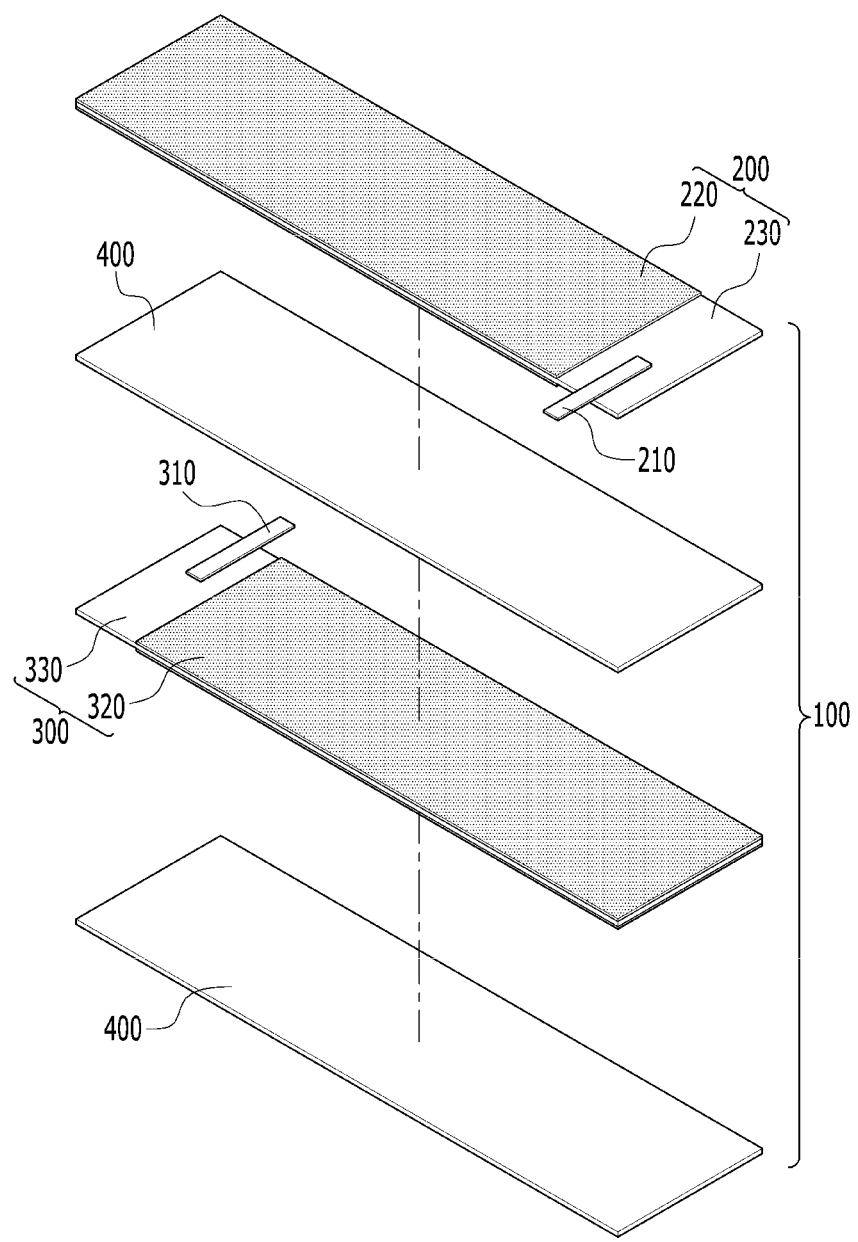
FIG. 1 is an exploded perspective view of the electrode assembly according to one embodiment of the present disclosure.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the drawings. In the figures, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 2:
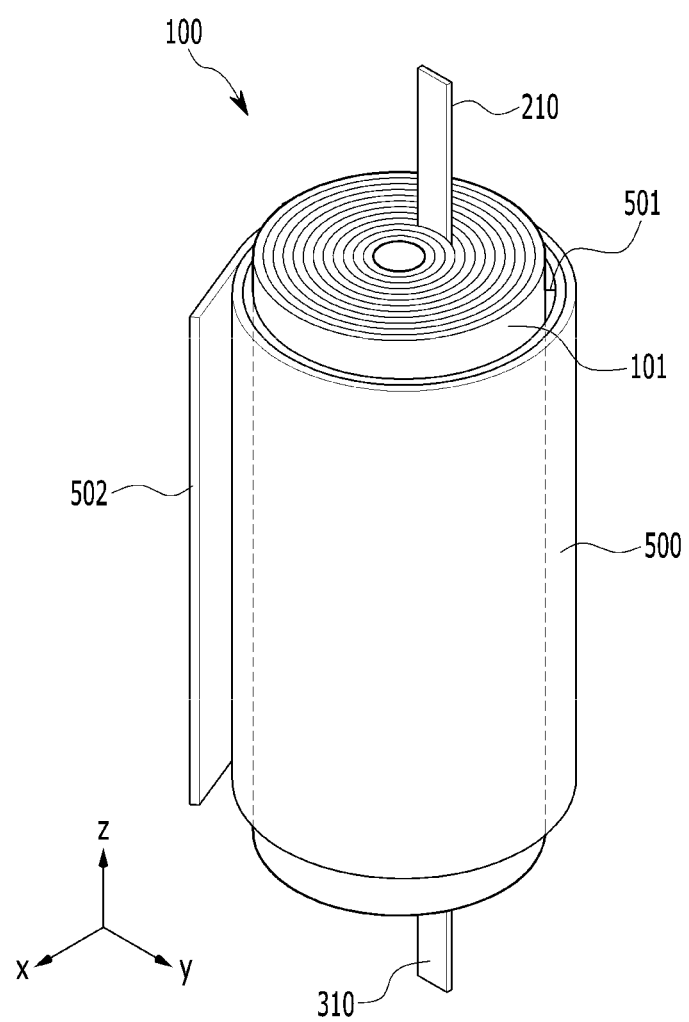
FIG. 2 is a perspective view showing a state in which the electrode assembly of FIG. 1 is wound and then wrapped in a flat spiral spring.
Figure 3:
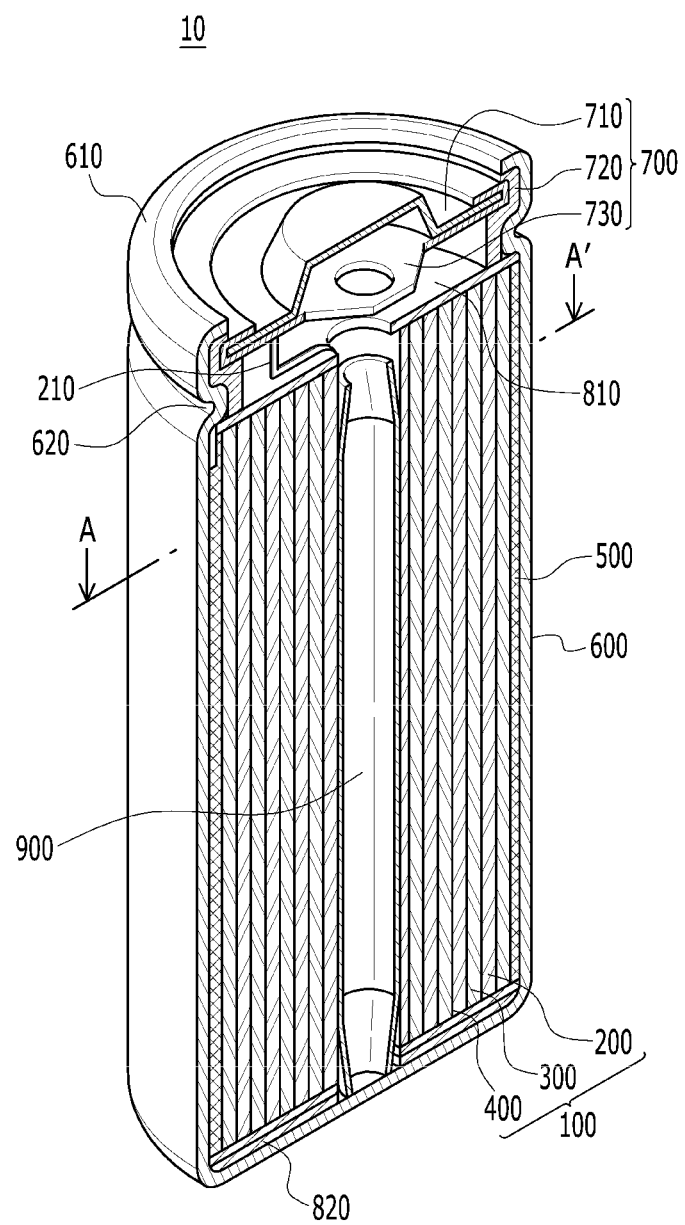
FIG. 3 is a cross-sectional perspective view of the secondary battery including the electrode assembly and the flat spiral spring in FIG. 2.

FIG. 1 is an exploded perspective view of the electrode assembly 100 according to one embodiment of the present disclosure, FIG. 2 is a perspective view showing a state in which the electrode assembly 100 of FIG. 1 is wound and then wrapped in a flat spiral spring 500, and FIG. 3 is a cross-sectional perspective view of the secondary battery including the electrode assembly and the flat spiral spring in FIG. 2.

Referring to FIGS. 1 to 3, the secondary battery 10 according to one embodiment of the present disclosure includes: an electrode assembly 100 having a jelly roll structure including a positive electrode sheet 200, a negative electrode sheet 300 and a separator 400, a cylindrical case 600 in which the electrode assembly 100 is built; and a flat spiral spring 500 positioned between an outer peripheral surface 101 of the electrode assembly 100 and an inner wall of the cylindrical case 600.

The electrode assembly 100 having a jelly roll structure is formed such that a positive electrode sheet 200, a negative electrode sheet 300, and a separator 400 are wound together, and the separator 400 may be interposed between the positive electrode sheet 200 and the negative electrode sheet 300. Further, when wound in the form of a jelly roll, in order to prevent the positive electrode sheet 200 and the negative electrode sheet 300 from contacting each other, a separator 400 may be additionally disposed under the negative electrode sheet 300.

A positive electrode active material is coated onto the positive electrode sheet 200 to form a positive electrode active material layer 220, and a positive electrode tab 210 may be joined to a positive electrode uncoated portion 230, on which the positive electrode active material layer 220 is not formed, by a method such as welding.

Similarly, a negative electrode active material is coated onto the negative electrode sheet 300 to form a negative electrode active material layer 320, and a negative electrode tab 310 may be joined to a negative electrode uncoated portion 330, on which the negative electrode active material layer 320 is not formed, by a method such as welding.

At this time, in FIG. 1, the positive electrode uncoated portion 230 and the negative electrode uncoated portion 330 are formed at one end of the positive electrode sheet 200 and the negative electrode sheet 300, respectively, but these correspond to one example, and may be formed in the middle by being separated from one end of the positive electrode sheet 200 and the negative electrode sheet 300.

Meanwhile, as shown in FIG. 1, it is desirable that the extension directions of the positive electrode tab 210 and the negative electrode tab 310 are opposite to each other. Accordingly, when the electrode assembly 100 is wound, the positive electrode tab 210 may be extended upward from the electrode assembly 100 (in z-axis direction), and the negative electrode tab 310 may be extended downward from the electrode assembly 100 (in a direction opposite to the z-axis), as shown in FIG. 2.

Figure 4:
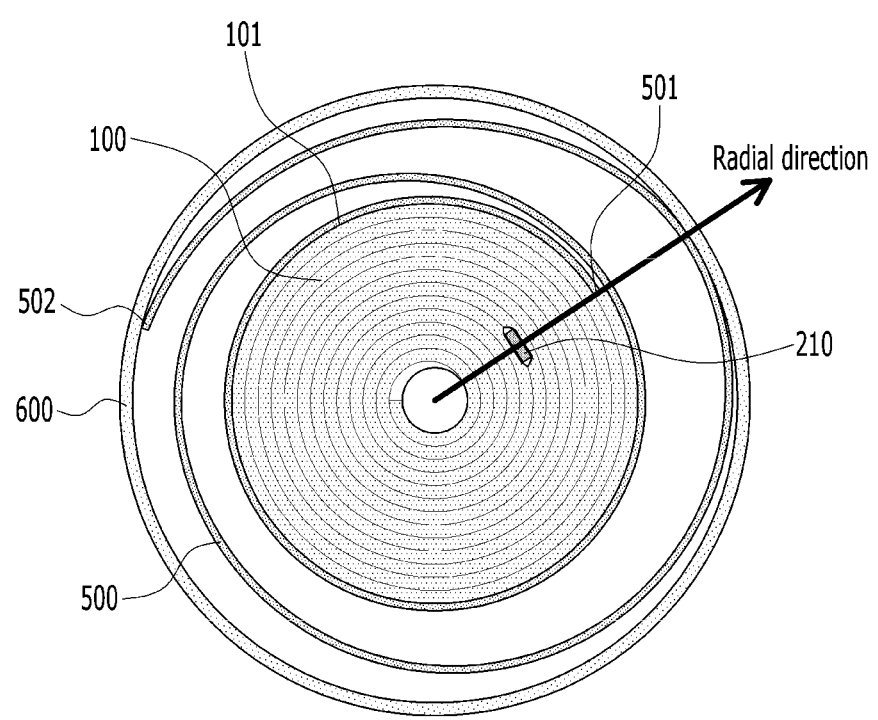
FIG. 4 is a schematic horizontal cross-sectional view illustrating A-A' in FIG. 3.

FIG. 4 is a schematic horizontal cross-sectional view illustrating A-A' in FIG. 3.

Referring to FIG. 4 together with FIGS. 1 to 3, the flat spiral spring 500 positioned between the outer peripheral surface 101 of the electrode assembly 100 and the inner wall of the cylindrical case 600 may be configured such that one end 501 comes into contact with the electrode assembly 100 and the other end 502 comes into contact with the inner wall of the cylindrical case 600.

Further, such flat spiral spring 500 may wrap the electrode assembly 100 one or more times in order to effectively press the electrode assembly 100.

As described above, a "swelling phenomenon" may occur in which the volume of the electrode assembly 100 expands during repetitive charging and discharging processes. If this swelling phenomenon is deepened, not only the performance of the secondary battery is deteriorated, but the outer shape of the secondary battery can be changed, thus adversely affecting the structural stability.

Thus, according to the present embodiment, the flat spiral spring 500 positioned between the outer peripheral surface 101 of the electrode assembly 100 and the inner wall of the cylindrical case 600 can not only stably fix the electrode assembly 100 inside the cylindrical case 600, but also effectively suppress the volume expansion of the electrode assembly 100.

When the volume expansion of the electrode assembly 100 is not suppressed, due to volume expansion, the distance between the positive electrode sheet 200 and the negative electrode sheet 300 increases and resistance increases, and eventually, reversible discharge may not be performed. At this time, the flat spiral spring 500 according to the present embodiment can effectively suppress the volume expansion of the electrode assembly 100, thereby enabling reversible charging and discharging of the secondary battery.

Further, since the spring has a spiral shape, a uniform pressure can be applied to the entire outer peripheral surface 101 of the electrode assembly 100. That is, the effect of suppressing the volume expansion can be uniformly exhibited over the entire outer peripheral surface 101.

Further, in FIG. 4, it was shown to be exaggerated for the sake of explanation, but the flat spiral spring 500 is a spring wound in a spiral shape and thus, may be disposed between the inside of the cylindrical case 600 and the cylindrical jelly roll electrode assembly 100 without occupying a large volume. That is, the space utilization rate is improved, which has an advantage in improving the battery capacity.

In particular, since the electrode assembly 100 has a relatively small volume when it is in a discharged state, the flat spiral spring 500 can be disposed on the outer peripheral surface of the electrode assembly 100 in a discharged state, and then inserted into the cylindrical case 600.

Thereafter, when charging is performed and the electrode assembly 100 is expanded, the flat spiral spring 500 may apply a uniform pressure to the entire outer peripheral surface of the electrode assembly 100 as described above.

Meanwhile, one end 501 of the flat spiral spring 500 can coincide with at least one of the positive electrode tab 210 or the negative electrode tab 310 in a radial direction of the electrode assembly 100.

Here, the radial direction means a direction corresponding to the radius on the basis of the center of the electrode assembly 100, when the wound electrode assembly 100 is viewed from above.

In FIG. 4, only the state in which the one end 501 coincides with a radial direction of the positive electrode tab 210 is shown, but the negative electrode tab 310 may also coincide with the one end 501 in the radial direction.

The wound electrode assembly 100 has no choice but to have an asymmetric shape, when viewed from above, due to the positive electrode tab 210 and the negative electrode tab 310 which are respectively attached to the positive electrode sheet 200 and the negative electrode sheet 300. When the electrode assembly 100 expands due to charging and discharging, the asymmetric shape is further deepened, which may cause a problem that the shape is distorted.

Therefore, one end 501 of the flat spiral spring 500 is arranged so that at least one of the positive electrode tab 210 or the negative electrode tab 310 coincides with the radial direction of the electrode assembly 100, the highest pressure can be applied to the portion where the shape distortion is most likely to occur. Through this, it is possible to minimize the distortion of the shape of the electrode assembly 100 due to the positive electrode tab 210 or the negative electrode tab 310 during volume expansion.

Furthermore, although not specifically shown, the thickness of the flat spiral spring 500 may increase as it goes toward the one end 501 from the other end 502.

By forming a thickness gradient in the flat spiral spring 500 in this way, one end 501 of the flat spiral spring 500 arranged at the position corresponding to the positive electrode tab 210 or the negative electrode tab 310 can be designed so as to apply a stronger elastic force. Through this, it is possible to minimize distortion of the shape of the electrode assembly 100 due to the positive electrode tab 210 or the negative electrode tab 310 during volume expansion.

Meanwhile, referring to FIG. 2 again, the flat spiral spring 500 according to the present embodiment may wrap the entire outer peripheral surface 101 of the electrode assembly 100. This is for applying a uniform pressure to the entire outer peripheral surface 101 of the electrode assembly 100.

Figure 5:
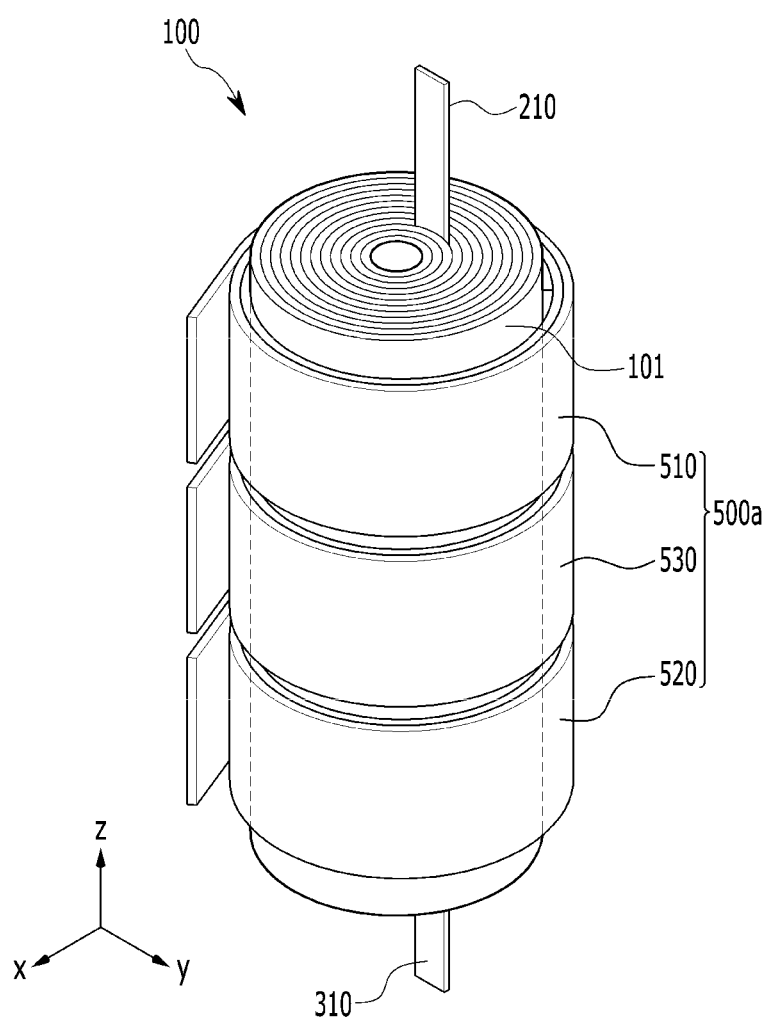
FIG. 5 is a perspective view showing a state in which an electrode assembly is wrapped in first to third flat spiral springs.

FIG. 5 is a perspective view showing a state in which the electrode assembly 100 is wrapped in first to third flat spiral springs 510, 520, and 530 as a modified embodiment of the present disclosure.

Referring to FIG. 5, as described above, the positive electrode tab 210 may be extended upward from the electrode assembly 100 (in z-axis direction), and the negative electrode tab 310 may be extended downward from the electrode assembly 100 (in a direction opposite to the z-axis).

The flat spiral spring 500a according to the present embodiment may include first and second flat spiral springs 510 and 520 respectively positioned at both ends of the electrode assembly 100 in the height direction (a direction parallel to the z-axis) of the electrode assembly 100. In particular, the first and second flat spiral springs 510 and 520 may respectively wrap portions corresponding to the portions to which the positive electrode tab 210 and the negative electrode tab 310 are attached, among the outer peripheral surface 101 of the electrode assembly 100.

Further, the flat spiral spring 500a may include a third flat spiral spring 530 positioned between the first and second flat spiral springs 510 and 520.

The flat spiral spring is classified into first to third flat spiral springs 510, 520 and 530, but in order to apply a uniform pressure to the entire outer peripheral surface 101 of the electrode assembly 100, the first to third flat spiral springs 510, 520 and 530 may wrap the entire outer peripheral surface 101 of the electrode assembly 100.

In this case, the first and second flat spiral springs 510 and 520 may have a larger spring constant than the third flat spiral spring 530, or the number of times of wrapping the electrode assembly may increase. That is, the pressure applied by the first and second flat spiral springs 510 and 520 may be greater than the pressure applied by the third flat spiral spring 530.

With respect to the height direction of the electrode assembly 100 (a direction parallel to the z-axis), both ends of the electrode assembly 100 correspond to portions to which the positive electrode tab 210 and the negative electrode tab 310 are attached, respectively. As mentioned above, the wound electrode assembly 100 has no choice but to have an asymmetric shape, when viewed from above, due to the positive electrode tab 210 and the negative electrode tab 310, and when the electrode assembly 100 expands due to charging and discharging, such asymmetric shape may be further deepened, which may cause a problem that the shape is distorted.

Accordingly, the spring constant of the first and second flat spiral springs 510 and 520 or the number of times of wrapping are made larger than those of the third flat spiral spring 530, a higher pressure was applied to the portion of the electrode assembly 100 in which shape distortion may most frequently occur in the height direction.

FIG. 5 shows only one positive electrode tab 210 and one negative electrode tab 310, respectively, but these are one example, and the plurality of positive electrode tabs 210 may be extended upward and the plurality of negative electrode tabs 310 may be extended downward. When the positive electrode tab 210 and the negative electrode tab 310 are each composed of a plurality of tabs in this way, the shape distortion may be more problematic during volume expansion, and thus, the first and second flat spiral springs 510 and 520 according to the present embodiment may be more effective.

Referring to FIG. 1 again, a negative electrode active material is coated onto the negative electrode sheet 300 to form a negative electrode active material layer 320, wherein the negative electrode active material may include at least one of Li, Si, $SiO_2$, or Sn.

When the negative electrode active material contains the above-mentioned materials, a larger volume expansion is induced in the electrode assembly 100 including the negative electrode sheet 300. Accordingly, the effect of suppressing volume expansion in the present disclosure through the flat spiral springs 500 and 500a may be more prominent when the negative electrode active material includes at least one of Li, Si, $SiO_2$, or Sn.

More specific examples of the negative electrode active material may include carbons such as hardly graphitizable carbon and graphite-based carbon; metal composite oxides such as $Li_xFe_2O_3(0 \leq x \leq 1)$, $Li_xWO_2(0 \leq x \leq 1)$, $Sn_xMe_{1-x}Me'_yO_z$(Me: Mn, Fe, Pb, Ge; Me': Al, B, P, Si, Group 1, 2, 3 elements in the periodic table, halogen; $0<x \leq 1$; $1 \leq y \leq 3$; $1 \leq z \leq 8$); lithium titanium oxide, lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; Li—Co—Ni based materials and the like.

Meanwhile, referring to FIG. 3 again, the secondary battery 10 in the present disclosure can be manufactured by housing the electrode assembly 100 in a cylindrical case 600, injecting an electrolyte solution into the cylindrical case 600, and then joining a cap assembly 700 to the upper end of the cylindrical case 600.

In this case, the cylindrical case 600 may include a crimping portion 610 and a beading portion 620.

The crimping portion 610 refers to a portion which are positioned above the beading portion 620 to wrap around the cap assembly 700, and is for stable joining of the cap assembly 700.

The beading portion 620 refers to a portion in which a portion of the cylindrical case 600 is recessed in the center direction of the electrode assembly 100, which is for stable coupling of the cap assembly 700 and preventing the electrode assembly 100 from flowing.

The cap assembly 700 includes an upper cap 710 for forming a positive electrode terminal, a cap plate 730 to which the positive electrode tab 210 extending upward from the electrode assembly 100 is connected, and a gasket 720 for maintaining airtightness.

The gasket 720 is mounted on the inner surface of the crimping portion 610 and the upper inner surface of the beading portion 620 to increase the sealing force between the cap assembly 700 and the cylindrical case 600.

Meanwhile, an upper end insulating member 810 and a lower end insulating member 820 are disposed on the upper and lower portions of the electrode assembly 100, respectively, so that it is possible to prevent the electrode assembly 100 from coming into contact with the cap assembly 700 or the bottom portion of the cylindrical case 600 and being energized.

Also, although not specifically shown, an insulating film which wraps the outer peripheral surface of the electrode assembly 100 may be added for electrical insulation, and the insulating film may be positioned between the outer peripheral surface of the electrode assembly 100 and the flat spiral spring 500 in the present disclosure.

A center pin 900 may be intercalated in the center of the electrode assembly 100. The center pin 900 generally includes a metal material to impart a predetermined strength, and consists of a cylindrical structure in which the plate material is bent into a round shape. The center pin 900 may function as a passage for fixing and supporting the electrode assembly 100 and for discharging gas generated by an internal reaction during charging/discharging and operation.

Meanwhile, the above-mentioned one or more secondary batteries according to embodiments of the present disclosure can be applied to various devices. These devices may be applied to transportation means such as an electric bicycle, an electric vehicle, a hybrid vehicle, without being limited thereto, and can be applied to various devices that can use the secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

The invention claimed is:

1. A secondary battery comprising:
an electrode assembly having a jelly roll structure including a positive electrode sheet, a negative electrode sheet and a separator;
a cylindrical case in which the electrode assembly is received; and
a flat spiral spring positioned between an outer peripheral surface of the electrode assembly and an inner surface of the cylindrical case,
wherein the flat spiral spring is configured such that a first end contacts the electrode assembly, a second end contacts the inner surface of the cylindrical case, and the flat spiral spring wraps the electrode assembly one or more times,
wherein a positive electrode tab attached to the positive electrode sheet is extended upward from the electrode assembly,
wherein a negative electrode tab attached to the negative electrode sheet is extended downward from the electrode assembly, and
wherein a contact point of the first end of the flat spiral spring on the electrode assembly coincides with at least one of the positive electrode tab or the negative electrode tab in a radial direction of the electrode assembly.

2. The secondary battery according to claim 1,
wherein the flat spiral spring includes first and second flat spiral springs respectively positioned at opposite ends of the electrode assembly in a height direction of the electrode assembly.

3. The secondary battery according to claim 2,
wherein the flat spiral spring includes a third flat spiral spring positioned between the first and second flat spiral springs.

4. The secondary battery according to claim 1,
wherein a negative electrode active material is coated onto the negative electrode sheet, and
the negative electrode active material comprises at least one of Li, Si, $SiO_2$, or Sn.

5. A device comprising the secondary battery according to claim 1.

6. A secondary battery comprising:
an electrode assembly having a jelly roll structure including a positive electrode sheet, a negative electrode sheet and a separator;
a cylindrical case in which the electrode assembly is received; and
a flat spiral spring positioned between an outer peripheral surface of the electrode assembly and an inner surface of the cylindrical case,
wherein the flat spiral spring is configured such that a first end contacts the electrode assembly, a second end contacts the inner surface of the cylindrical case, and the flat spiral spring wraps the electrode assembly one or more times, and
wherein a thickness of the flat spiral spring increases from the first end to the second end.

7. A secondary battery comprising:
an electrode assembly having a jelly roll structure including a positive electrode sheet, a negative electrode sheet and a separator;
a cylindrical case in which the electrode assembly is received; and
a flat spiral spring positioned between an outer peripheral surface of the electrode assembly and an inner surface of the cylindrical case,
wherein the flat spiral spring is configured such that a first end contacts the electrode assembly, a second end contacts the inner surface of the cylindrical case, and the flat spiral spring wraps the electrode assembly one or more times,
wherein the flat spiral spring includes first and second flat spiral springs respectively positioned at opposite ends of the electrode assembly in a height direction of the electrode assembly and a third flat spiral spring positioned between the first and second flat spiral springs, and
wherein the first and second flat spiral springs have a larger spring constant than a spring constant of the third flat spiral spring or a number of times of wrapping the electrode assembly by the first and second flat spiral springs is greater than a number of times of wrapping the electrode assembly by the third flat spiral spring.

8. The secondary battery according to claim 7,
wherein a positive electrode tab attached to the positive electrode sheet is extended upward from the electrode assembly, and
a negative electrode tab attached to the negative electrode sheet is extended downward from the electrode assembly.

9. The secondary battery according to claim 8,
wherein the first and second flat spiral springs respectively wrap portions of the outer peripheral surface of the electrode assembly corresponding to portions to which the positive electrode tab and the negative electrode tab are attached to the electrode assembly.

* * * * *